United States Patent [19]
Blanshine et al.

[11] 3,827,223
[45] Aug. 6, 1974

[54] HAY ROLL FORMING MACHINE

[75] Inventors: Allison W. Blanshine, Lititz; Jack W. Crane, New Holland; Aquila D. Mast, Lancaster, all of Pa.

[73] Assignee: Sperry Rand Corporation, New Holland, Pa.

[22] Filed: Apr. 24, 1973

[21] Appl. No.: 353,944

[52] U.S. Cl. .............................................. 56/341
[51] Int. Cl. ........................................... A01d 39/00
[58] Field of Search ........................... 56/341–343; 100/5, 71, 88

[56] References Cited
UNITED STATES PATENTS

| | | | |
|---|---|---|---|
| 2,096,990 | 10/1937 | Luebben | 100/88 |
| 2,581,542 | 1/1952 | Kolzing | 56/343 |
| 2,627,223 | 2/1953 | Berge | 100/88 X |
| 2,785,625 | 3/1957 | Wiseman et al. | 100/88 |
| 3,722,197 | 3/1973 | Vermeer | 56/341 |

*Primary Examiner*—Russell R. Kinsey
*Attorney, Agent, or Firm*—Joseph A. Brown; James J. Kennedy; C. Hercus Just

[57] ABSTRACT

A machine to form compact rolls of hay of substantial size by picking up a swath or windrow of hay and the like from a field, engage it by cooperating upper and lower endless flexible aprons driven in suitable directions to coil the hay into a compact roll while supported upon floor means mounted stationarily in the bottom of the machine to effect baling of all the hay without loss upon the ground. When the roll type bale of hay reaches a predetermined diameter, the upper apron is raised to provide an exit and the lower apron assists in ejecting the bale onto the ground, or the machine can transport it to a desired location for discharge, if desired. The roll is initiated within a space between the upper and lower aprons which in cross-section is wedge shaped, the lesser distance between the cooperating courses of the aprons being adjacent the forward end of the machine, and results in a relatively soft core for the rolls, whereby when ultimate pressure is formed in the finished roll, the core is not unduly compressed.

4 Claims, 12 Drawing Figures

PATENTED AUG 6 1974  3,827,223

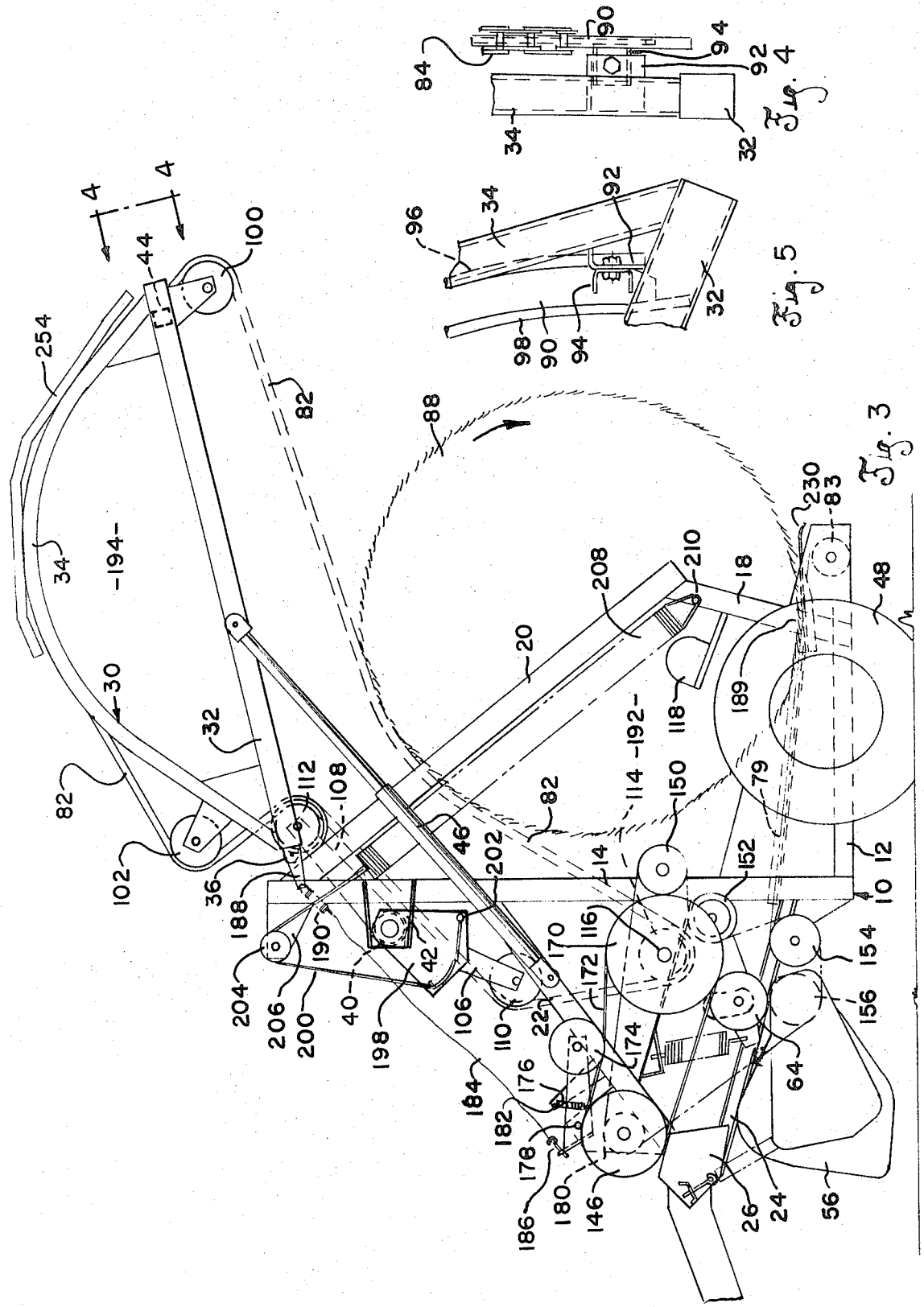

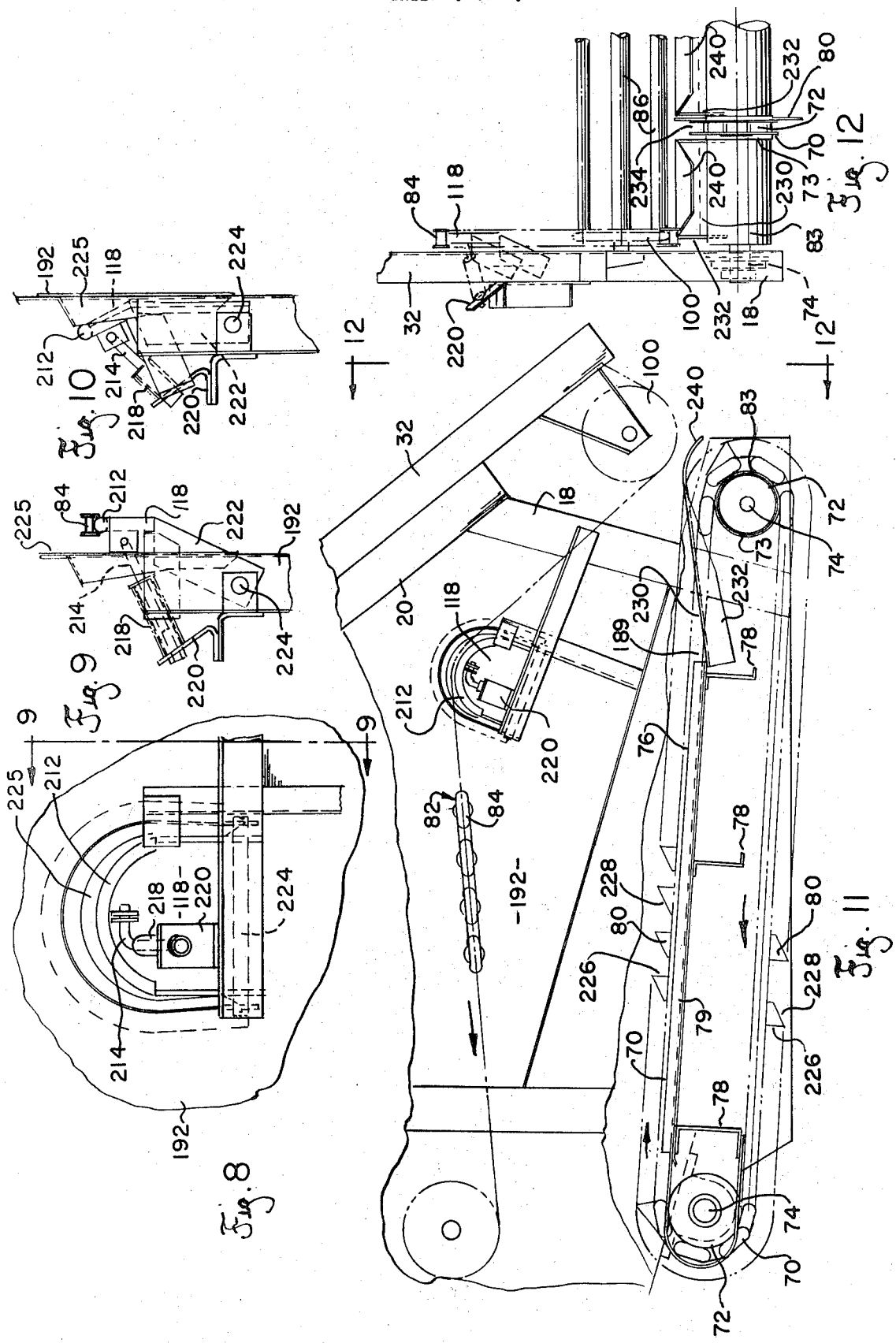

HAY ROLL FORMING MACHINE

BACKGROUND OF THE INVENTION

For many years, it has been customary to harvest forage crops, such as various kinds of hay and leaf-type forage plants by mowing the same in a field, letting them lie for several days to dry, forming the cut and at least partially dryed crop into windrows, and passing a hay-baling machine over and along such windrows to form the crop into rectangular bales which are secured by passing one or more tying strands around the bale. The bales then are picked up by various means and are taken to a barn or similar building in which piles of such bales are stored until used. In recent years, it has been found that if hay and similar forage crops are formed into a large, compact roll by various types of machines, the cylindrical formation of the roll tends to provide self-shedding of rain and other inclement weather substances if the roll is left lying in a field or feed lot where cattle and other herbivorous animals may feed upon it, without requiring the roll to be taken to a storage shed.

Large rolls of forage crops of the type described frequently are of the order of 4 or 5 feet in diameter and 6 or 8 feet long. Rolls of this size may weigh as much as several tons. If they are to be moved, following the formation thereof, special types of equipment must be used. The present invention is concerned with the formation of compact rolls of forage material, such as hay, and the details thereof are set-forth hereinafter.

Forming compact, large rolls of hay has engaged the attention of various inventors heretofore. Several different principles have been utilized in the inventions thus produced. One type forms a roll or coil of hay and the like by initiating the formation of such roll by suitable mechanism and continue to roll a swath or windrow of the hay while supported upon the ground. Examples of such mechanisms are shown in prior U.S. Pat. No. 3110145, to Avery, dated Nov. 12, 1963. Another such machine comprises the subject matter of U.S. Pat. No. 3650100, to Swan, dated Mar. 21, 1972. One of the principle difficulties resulting from this method of forming rolls of hay is that a certain amount of the hay remains upon the field without being included in the roll of hay, such as the fines. Further, dirt, clods of earth, stones and the like also can be picked up by the roll and this is undesirable under certain circumstances.

A second principle method of forming rolls of the type referred to comprises a machine in which a swath or windrow of the crop is picked up from the field and directed onto a supporting conveyor or the like while the same is formed into a coil or roll of the forage crop and is out of contact with the ground, thus resulting in the formation of a cleaner type of roll or coil of hay, as well as the same including most if not all of the fines of the crop, thus minimizing waste. One example of a prior machine for forming a coil or roll of hay is illustrated in U.S. Pat. No. 3665690, to Wenger, dated May 30, 1972. The particular design of the machine shown in said patent offers a certain amount of friction between the roll and the supporting frame of the machine, which is undesirable, and another undesirable feature is that the coil of hay is formed upon a core member rather than being a free-form of roll which has no core or mandrel. The foregoing objectionable features are obviated in the design of machine comprising the present invention and a substantial number of improvements in the art of forming large sizes of compact rolls of hay and other forage crops are provided in said machine, details of which are as follows.

The improved features for a hay roll forming machine which comprise the present invention are part of a complete machine which has other novel and patentable features in addition to those of the present invention. Such other features comprise the subject matters of other related applications in which the instant inventors or others are the inventors. However, for purposes of providing a full understanding of the present invention and the benefits afforded the overall machine thereby, a description of the entire machine, or at least a substantial part thereof is set forth hereinafter relative to suitable drawings to illustrate the same, the present invention being described and shown in particular therein.

SUMMARY OF THE INVENTION

It is the principle object of the present invention to provide a machine for forming a compact roll of hay or similar forage crop of substantial diameter and length by providing means to pick up a swath or windrow of such crop by suitable means and feed it to a space between a flexible, endless lower apron means movable relative to a bottom panel or floor, which is fixedly supported in the lower portion of the machine, and the lower course of an upper flexible apron in a manner to initiate the formation of a coil of said forage crop within a space which is wedge shape in cross-section, the narrower height being adjacent the forward end of the cooperating courses of said aprons which coil said swath into a roll by rearward movement of the upper course of the lower apron and forward movement of the lower course of the upper apron, whereby an initially relatively soft core is formed which, as the size of the roll increases, becomes more compact but ultimately is not unduly compressed so that, when the core is reached for feeding, it is still readily consumable by live stock to be fed thereby.

It is another object of the invention to form the lower apron from a series of endless chains spaced apart even distances transversely across the floor of the machine, the upper courses of said chains being slideably supported in guide channels upon the floor or bed in the machine which is lowermost therein, said chains being driven simultaneously by appropriate sprockets and said chains having upstanding lugs which aggressively engage the lower surface of the roll of crop material, as it is rotated within the machine about its own axis and constantly increases in diameter, due to said aforementioned movements of the upper courses of said chains and the lower course of the upper apron.

It is still another object of the invention to provide at opposite sides of the machine, at locations spaced a limited distance above the floor or bed thereof, guide means over which the lower course of the upper apron moves during the initial portion of the formation of a new roll of material to define the upper surface of said wedge shaped space until the diameter of the new roll is such that the upper surface thereof forces the the upper apron from said guide means, whereupon the lower course of said upper apron continues to engage a constantly greater area of the upper portion of said roll to facilitate continued rotation of said roll by cooperating with said lower apron.

It is another object of the invention to support the upper apron of the machine upon an auxiliary, upper frame pivotally connected at one end to a base frame on said machine, said upper frame being adapted to be raised at the rear end to form an exit opening relative to the lower apron through which a completed roll is discharged, following which the upper frame is restored to operative position relative to the lower apron and the wedge shaped space between the aprons is restored for the formation of a new roll.

Details of the foregoing objects and of the invention, as well as other objects thereof, are set forth in the following specification and illustrated in the accompanying drawings comprising apart thereof.

BRIEF DESCRIPTION OF THE DRAWINGS

FIG. 3 is a side elevation of the machine with the parts thereof illustrated in discharge position.

FIG. 4 is a fragmentary end view of a portion of the machine as seen on the line 4—4 of FIG. 3.

FIG. 5 is a fragmentary side elevation of the portion of the structure shown in FIG. 4.

FIG. 8 is a fragmentary side elevation on a larger scale than in FIGS. 1–3 and showing supplemental guide means for the upper apron.

FIG. 9 is a fragmentary end view of the detail of the machine shown in FIG. 8 as seen on the line 9—9 thereof, said figure also illustrating portions of the mechanism in normal, operative position.

FIG. 10 is a view similar to FIG. 9 but showing said portions of the machine in released, inoperative position.

FIG. 11 is a fragmentary, partially diagrammatic view illustrating the function of the portion of the machine shown in FIGS. 8–10 in association with the floor or bed of the machine and the lower apron thereon.

FIG. 12 is a fragmentary end view of the portion of the machine shown in FIG. 11 as seen on the line 12—12 thereof.

DETAILED DESCRIPTION

Figure 1:
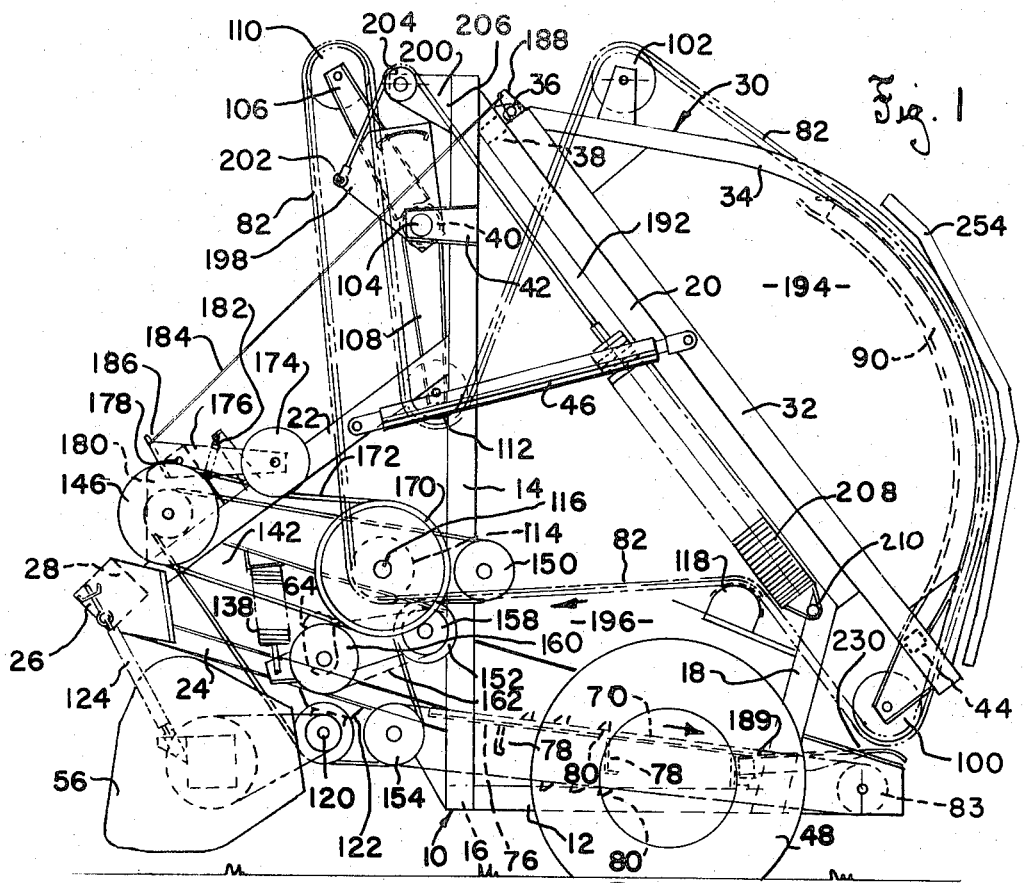
FIG. 1 is a side elevation of a hay roll forming machine embodying the principles of the present invention and showing the various parts thereof in the position thereof for starting the formation of a hay roll, the upper apron being illustrated in compact or contracted position.
Figure 2:
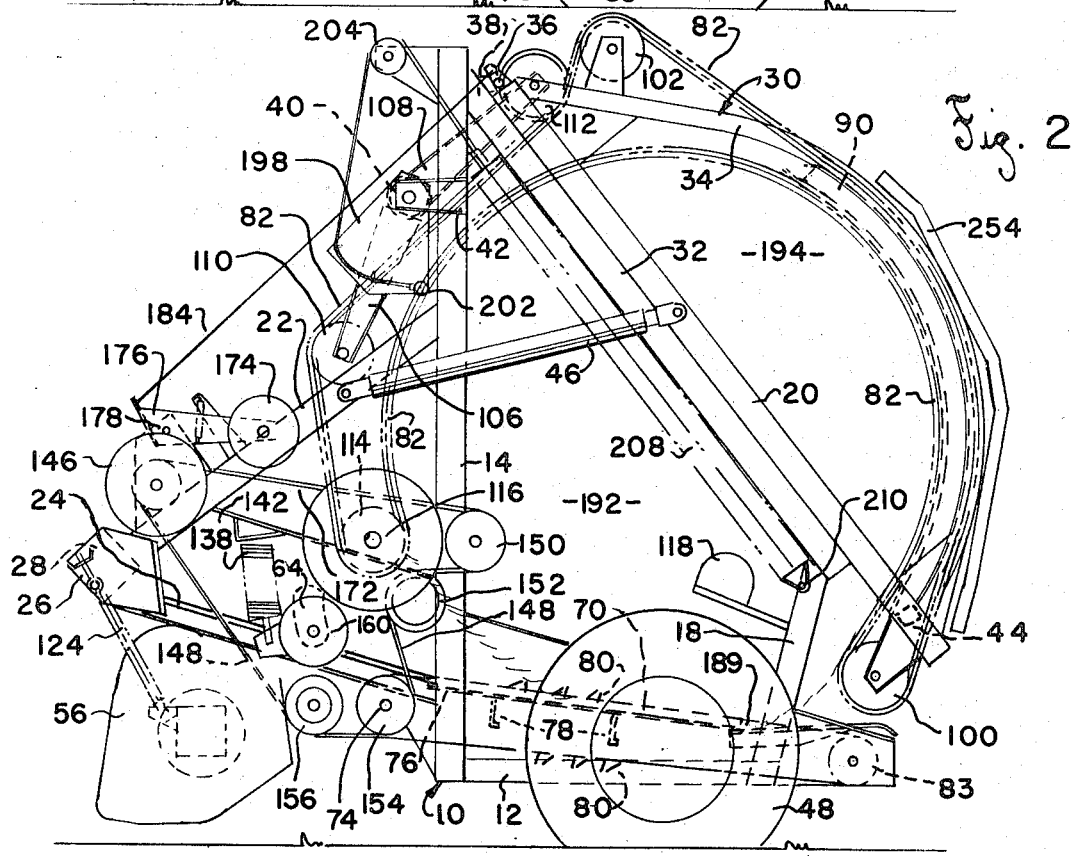
FIG. 2 is a view similar to FIG. 1 but showing the parts of the machine positioned substantially at the conclusion of forming a maximum size of hay roll.

Referring to FIGS. 1–3, the machine illustrated therein comprises a base frame 10 which has similar side arrangements of structural members fixedly connected together, such as by welding or the like. Each side of said frame comprises a bottom horizontal member 12. The forward end thereof is connected to a vertical member 14 of substantial height. Also, extending perpendicularly to the junction of members 12 and 14 is a cross member 16, the adjacent end of which is fixedly connected to the junction of members 12 and 14. A short frame member 18 extends upwardly from the rearward portion of bottom member 12 and the upper end thereof is connected to one end of an upwardly and forwardly extending angular brace member 20 which is connected at it's upper end to the upper end of vertical member 14. Extending forwardly from the front face of member 14 at each side of the machine is an A-frame consisting of angularly related members 22 and 24, the rearward ends of which are fixed to the front face of vertical member 14 and the forward ends thereof are connected together and also are attached to polygonal plates 26, said plates also being fixed to and covering the outer ends of a horizontal cross member 28. The various frame members thus far described, which comprise the base frame 10, may be formed from heavy structural tubing, channels, or any other appropriate structural form commonly employed in framing of the type described.

An auxiliary or upper frame 30 also is provided which consists of side frames composed of a straight frame member 32, the ends of which are connected to the opposite ends of an arcuate frame member 34. The uppermost portion of each side frame member is pivotally connected at 36 to a suitable bearing fixed to the upper end of vertical frame member 14 of the base frame, as clearly shown in FIGS. 1–3. A suitable cross frame member 38 also extends between the upper ends of angular brace members 20 of frame 10 and thereby stabilizes the connection of the upper frame 30 at opposite sides thereof by the pivotal connections 36 to the uppermost end of the base frame 10. The upper end of base frame 10 also is further stablized transversely by means of another cross tube 40, or similar horizontal bracing member which extends between bearing brackets 42 which are connected to the front faces of the vertical frame members 14 such as by welding.

The lower rearward end of upper frame 30, as viewed in FIGS. 1 and 2, also has a cross frame member 44 extending between the opposite side frame means composed of members 32 and 34.

Upper frame 30 is moved between it's lower, operative position such as shown in FIGS. 1 and 2, and its extended, or discharge position, as shown in FIG. 3, by means of a pair of hydraulic cylinder and piston units 46, the opposite ends of which respectively are connected to the members 22 and 32 of base frame 10 and upper frame 30, intermediately of the ends thereof, as shown in FIGS. 1–3. Suitable hydraulic lines, of conventional type, not shown, are connected to opposite ends of the cylinder of each unit 46 and said units at opposite sides of the frame operate simultaneously under all circumstances.

Figure 6:
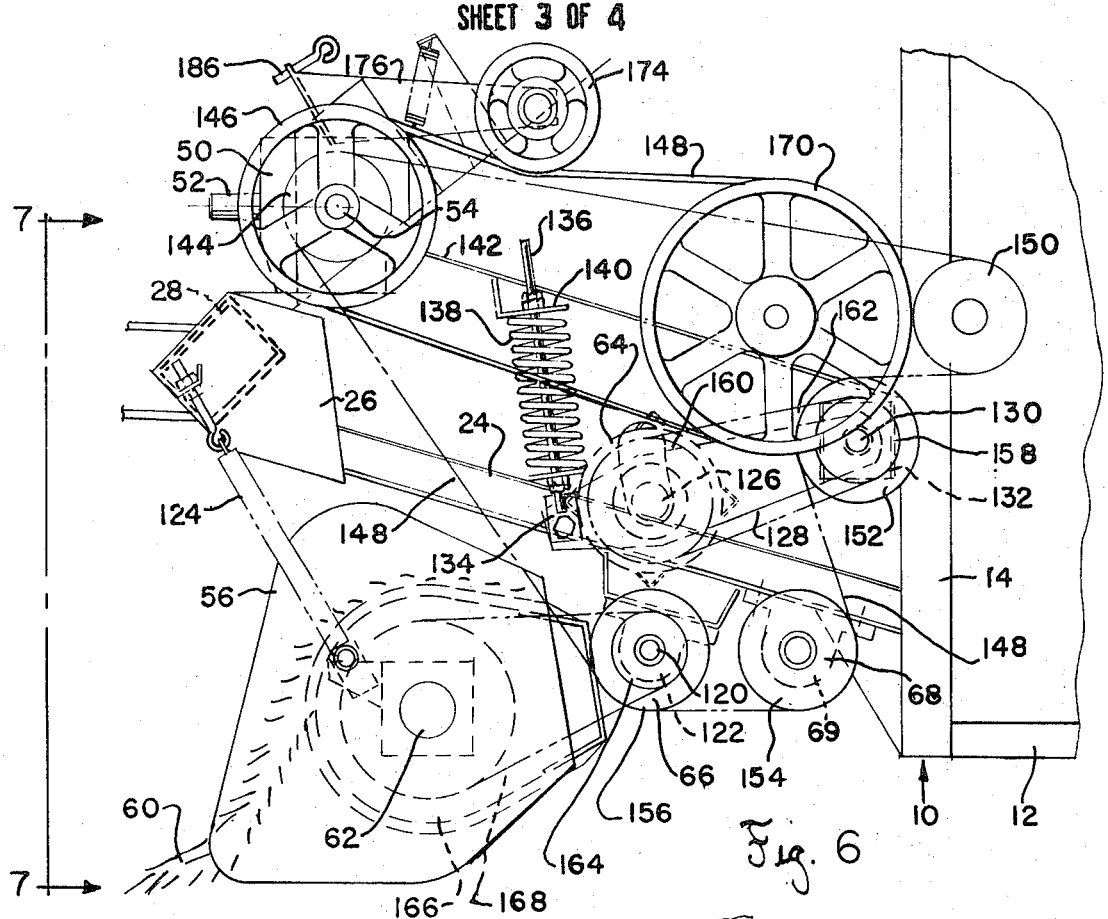
FIG. 6 is a fragmentary side elevation showing, on a scale larger than in the preceding figures, portions of the drive mechanism and control means incorporated therewith.

As will be seen from FIGS. 1–3, the base frame 10 has a pair of conventional wheels 48 connected thereto at opposite sides of the frame, by any suitable axle means, not shown but of appropriate conventional type, in order that the hay roll forming machine comprising the present invention may be drawn by a tractor or other similar implement over a field for purposes of forming a roll of hay or similar forage material. Referring to FIG. 6, the forward end of the machine has an appropriate gear box 50 interconnected to suitable transverse supporting means, including the cross member 28 for example. The gear box has an input shaft 52 which is connectable to the driven end of a power take-off unit (p.t.o.) provided on and extending rearwardly from a suitable tractor unit or equivalent power mechanism. A power output shaft 54 extends from the gear box 50 to one side of the machine as viewed in FIGS. 1–3 and 6.

Figure 7:
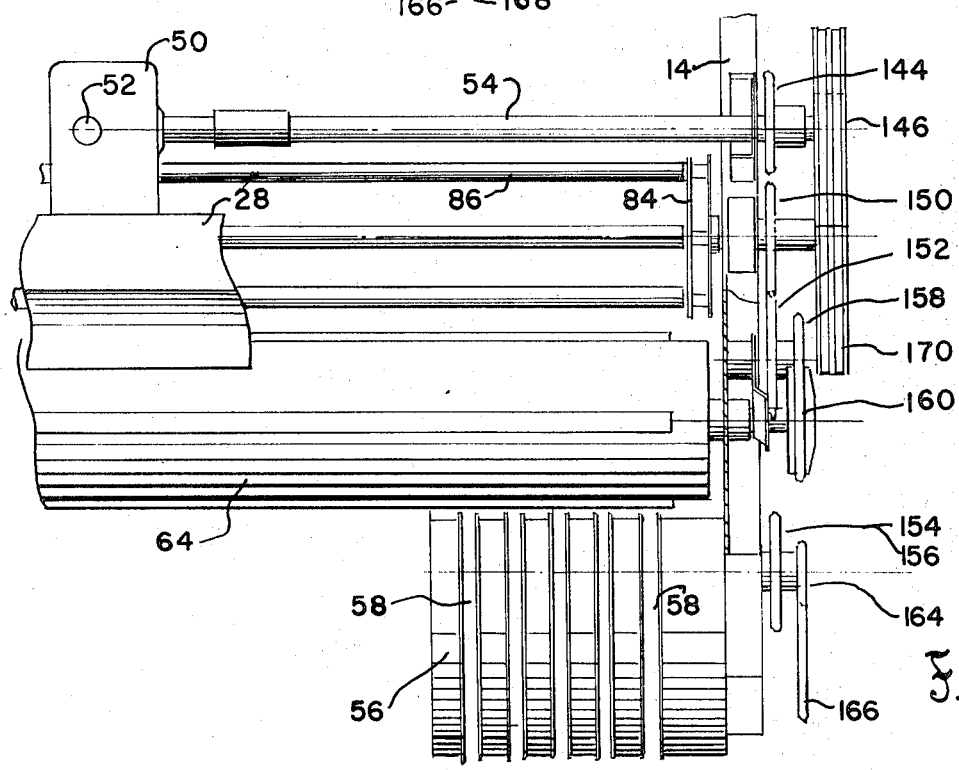
FIG. 7 is a fragmentary front view of the portion of the machine shown in FIG. 6.

Extending forwardly from the front end of base frame 10 is a pick-up header unit 56 of a type adapted to engage, elevate from a field and rearwardly feed a swath or windrow of forage material which is in at least semi-dried condition. A fragmentary illustration of the forward portion of the header 56 is shown in FIG. 7. It comprises a drum having a series of transversely spaced, circular slots 58 therein, through which a series of spring fingers, not shown, but of conventional agricultural nature as shown in U.S. Pat. No. 2,581,542, extend for purposes of picking up a swath or windrow 60 of at least semi-dried forage material, as shown in FIG. 6, for purposes of moving the same to the entrance end of the machine. Said spring fingers are driven by a shaft 62, in clockwise direction, by means to be described, for purposes of elevating and feeding the material between a pair of compressing rollers 64 and 66, for purposes of leveling and preferably somewhat spreading transversely the swath or windrow which passes there between.

The flattened and somewhat spread material then passes to the entrance end of the lower apron which extends around driven roller 68, which is supported upon a shaft extending between bearings 69 respectively mounted upon the members 24 at opposite sides of the base frame 10, as clearly shown in FIG. 6. The compressing rollers 64 and 66 also are supported upon two transverse shafts, the opposite ends of which respectively are supported in suitable bearings which also are mounted upon the members 24 of the base frame at opposite sides of the machine, as best shown in FIG. 6.

The lower apron propelling means preferably comprises a series of endless, flexible chains 70, see FIG. 11, which are transversely spaced apart even distances and respectively extend around sprocket gears 72 which are mounted upon a shaft 74 which is rotatably supported adjacent the forward end of the bottom or floor 76 which is fixedly connected to the base frame 10. At the rearward end of floor 76, cylindrical guide members 73 are formed on transverse tube 83 which extends between opposite side members 12 of base frame 10 to provide rear guide means around which chains 70 extend. The floor is supported by a series of transversely extending bars 78 which are connected to the bottom members 12 of base frame 10. The upper courses of the chains 70 preferably slide within metal channels 79, which are fixed to the bottom 76, by any suitable means, said channels being shown best in FIGS. 3 and 11.

Referring to FIGS. 11 and 12, it will also be seen that the alternate links of the chain 70 have aggressive type lugs 80 connected thereto. The upper courses of the chains 70 move in the direction of the arrows shown in FIG. 11 and the forward edges of the lugs 80 extend substantially perpendicularly to the axis of the chain while the upper edge of each lug slopes rearward and downward. Such shape provides aggressive engagement with the roll being formed to facilitate rotary movement of a roll in counterclockwise direction, as viewed in FIGS. 1–3, and such engagement of the lugs 80 with the roll also tends to dispose the stems and fibers of the forage material substantially circumferential to provide a substantial tendency for the completed roll to shed rain the the like.

The upper frame 30 and certain guide rolls and sprockets which augment the same support the upper apron 82, which is shown in outline form in FIGS. 1–3. Said apron preferably comprises a pair of endless, flexible link-type chains 84, fragmentary examples of which are shown in FIGS. 7, and 12. At longitudinally spaced intervals of suitable dimension, such as of the order of 8 or 10 inches, a series of bars 86 extend between said chains for substantially the full width of the machine. Fragmentary examples of such bars are shown in FIGS. 7 and 12. In cross section, the bars may be square or any other suitable geometric shape, such as cylindrical, for purposes of offering resistance to bending of the bars, especially when engaging the periphery of a roll of hay 88, an example of which is shown in exemplary manner in FIG. 2. The upper apron 82 is supported upon various guide rolls and sprockets, and the edges of guide bars, as follows.

Referring to FIGS. 4 and 5 in particular, it'll be seen that, adjacent each side of upper frame 30, and spaced inwardly therefrom, is an arcuate bar 90 which is appropriately connected to the arcuate frame member 34 at each side of the upper frame 30 by suitable brackets 92 and 94 respectively fixed to members 34 and bars 90, and bolted together as shown in FIGS. 4 and 5. The opposite edges of the arcuate bars 90 are rounded to strengthen the same and also minimize wear. The outer edge 96 is convex, and the inner edge 98 thereof is concave. Referring to FIGS. 1–3, the arcuate bars 90 are not shown but it will be understood that the same conform generally to the shape of the arcuate frame members 34 and the upper course of the chains 84 of upper apron 82 slideably engages the convex edge 96 of each of the arcuate guide bars 90.

At each side of the upper frame 30, adjacent opposite ends thereof, suitable guide sprockets 100 and 102 respectively are supported by clevises which are connected to the opposite ends of the arcuate member 34 at each side of the frame. Affixed to ends of shaft 104, which is supported in bearing brackets 42 adjacent the upper end of vertical frame members 14, are pairs of oppositely extending arms 106 and 108. Said arms respectively comprise take up and expansion means for the upper apron 82 and operate as a pivoted supplemental frame. The ends of said arms support rotatable guide sprockets 110 and 112 adjacent the opposite ends of the arms and the chains 84 of the upper apron 82 extend therearound in the manner shown in FIGS. 1–3. Lastly, a driving sprocket 114 is provided at each side of the main frame and connected to a driven shaft 116 that is supported in appropriate bearings fixed relative to the main frame 10. The chains 84 of the upper apron 82 also extend around said driving sprockets. The lower course of the upper apron 82 also slideably extends over the upper curved surface of movably mounted auxiliary guide members 118, details of which are best shown in FIGS. 8–12 and are described hereinafter.

The pick-up header unit 56 is pivotally supported at its rearward end upon a shaft 120 which is rotatably supported at its opposite ends in bearings 122 connected to frame members 24 at opposite sides of the machine. The forward end of the pick-up header unit 56 is yieldably restrained against downward movement by a pair of springs 124 respectively connected at one end to the cross member 28 of the frame of the machine and, at the other end, being connected to end plates on the header 56 at opposite ends thereof. If desired, auxiliary wheels, not shown, may be rotatably mounted at opposite ends of the header unit 56 for engagement with the ground.

Upper compression roll 64 is supported by a shaft 126, the opposite ends of which are rotatable in bearings formed in arms 128, best shown in FIG. 6, the rearward end of said arms being supported upon pivot shafts 130 mounted in bearing brackets 132 which are fixed to vertical frame members 14. The opposite ends of arms 128 respectively at the opposite sides of the machine have clevises 134 connected thereto and a rod 136 extends upward from each clevis and is surrounded by a compression spring 138 which extends between each clevis 134 and a bracket 140 which is connected to a side plate 142 on each side of the machine.

DRIVE MECHANISM

As set forth above, power for the machine is derived from a p.t.o. of a tractor or the like, which is connected to shaft 52. Power output shaft 54 has a sprocket gear 144 connected to the outer end thereof as shown in FIGS. 6 and 7. Shaft 54 also extends beyond the outer end of sprocket gear 144 and has a large multiple sheave 146 fixed thereto. A sprocket chain 148 extends around sprocket gear 144 which comprises a driving sprocket. Chain 148, which is driven by sprocket gear 144 extends around idler sprocket gear 150 which is supported in a bearing on frame member 14. Chain 148 then extends around sprocket gear 152, another sprocket gear 154, and a further sprocket gear 156, from which the chain extends to the driving sprocket gear 144. Accordingly, all of the moving elements of the machine, with the exception of upper apron 82, are driven by the sprocket chain 148.

Another sprocket gear 158, of smaller diameter than sprocket gear 152, is fixed to one end of pivot shaft 130 for support thereby and a driven sprocket gear 160 is fixed to shaft 126 of the upper compression roller 64 to drive the same by means of a sprocket chain 162 which extends around the sprocket gears 158 and 160. The various vertical planes within which the pairs of driving and driven sprocket gears are located are best illustrated in FIG. 7.

Sprocket gear 156 is a driving gear for the smaller sprocket gear 164 which is connected to shaft 120 and is in the same plane as the larger driven sprocket gear 166. Sprocket chain 168 extends around the gears 164 and 166 and thereby effecting rotation of shaft 62 which drives the pick-up fingers of the header unit 56 which operate within in the circular slots 58 thereof.

The power output shaft 54 also supplies the power for driving the upper apron 82. This is accomplished by the multiple sheave 146 which is connected to the outer end of shaft 54, as indicated above, and a driven multiple sheave 170. A series of V-belts 172 extend around the multiple sheaves 146 and 170 in a loose condition, whereby the same comprise part of what may be considered a clutch arrangement. Multiple belt-tightening sheaves 174 are supported rotatably on the outer end of arm 176 which is pivoted at 178 to a bracket plate 180. A tension spring 182 is mounted in a manner to normally elevate the tightening sheaves 174 to inoperative position.

The purpose of the clutch-type arrangement described immediately above is to stop the movement of upper apron 82 when the upper frame 30 is moved to the elevated, discharge position thereof shown in FIG. 3. When this occurs however, the lower apron comprising the chains 70 continue to move in a direction to expel the completed roll 88 of hay or the like from the machine. Such continued movement of the lower apron is effected by driven sprocket 154 which is connected to the outer end of the shaft which supports the sprocket gears 72 for the chains 70.

Operation of such clutch mechanism is effected by the position of the tightening sheaves 174 with respect to the belts 172. Movement of the arm 176 in a direction to cause the sheaves 182 to tighten the belts 172 is effected by a cable 184, one end of which is fixed to eyelet 186 on the forward end of lever 176 and the opposite end of the cable is connected to a short arm 188 which projects outwardly from the frame member 32 of upper frame 30, as best shown in FIGS. 1 and 3. If desired, a spring 190 of predetermined tension strength is connected between said other end of cable 184 and the arm 188, as shown in FIG. 3. By comparing FIGS. 1 and 3, it'll be seen that in FIG. 1, the cable 184 is under tension by reason of the position of arm 188 on upper frame 30, whereby the tightening sheaves 174 are in tightening engagement with the belts 172 and thereby cause driving of the driven sheaves 170 by the driving sheaves 146, thus moving the upper apron 82 at a predetermined speed which, under preferred conditions, is slightly slower than the surface speed of the chains 70 of the lower apron which, by way of example, preferably is about five per cent slower and results in the slightly faster moving lower apron chains 70 urging the roll toward the discharge end of the machine. In view of the lowered position of the upper frame 30 during the formation of the roll, however, there is no possibility for the roll to discharge from the machine prematurely. In accordance with the invention, a shallow valley 189 is formed in floor 76 to facilitate such positioning of the roll as aforesaid, as shown in FIGS. 1 and 2. As shown in FIG. 3, when the upper frame 30 is elevated to discharge position, the cable 184 goes slack and the spring 162 raises the tightening sheaves 174 to idle position, thus stopping the movement of the upper apron 82.

UPPER APRON EXPANDING MECHANISM

Reference is made to FIGS. 1 and 2 in which the starting and final positions of the upper apron 82 are illustrated to best advantage. When a roll of hay or the like is first initiated, the swath or windrow 60 of the material is delivered to the forward end of the lower apron comprising the chains 70. Referring to FIG. 1, it will be seen that the initial position of the lower course of the upper apron 82 extends over the auxiliary guide members 118 at opposite sides of the inner surfaces of the side plates 192 of the machine which extend between and are fixed to the vertical frame member 14, diagonal brace members 20, frame members 18 and horizontal bottom members 12, as well as between the angularly disposed frame members 22 and 24. Also, there are additional side plates 194 which extend across the major portion of the space defined by the frame members 32 and 34 of upper frame 30. Such side plates 192 and 194 confine the opposite ends of the roll 88 of hay or the like while it is being formed.

From FIG. 1 it will be seen that the initial part of the roll of hay or the like which is being formed, occurs in a wedge shaped space 196 which is less high at the forward end than the rearward end and is defined at the top by the lower straight course of the upper apron 82 disposed between sprockets 114 and auxiliary guide members 118, and the upper course of the lower apron comprising chains 70. This feature is of great importance in the present invention because the shape of this space not only greatly facilitates initiation of the rolling of the material, especially because the entrance end of the space 196 being less high than the rearward end results in the coiling by the reversely moving courses of the aprons producing a somewhat loose core or center in the roll. This is important because further coiling tends to compress the core but even in a completed roll, the core is still reasonably uncompacted. It has been found in use, that by the time the live stock have consumed the roll down to the core portion, it is still readily consumable without difficulty, whereas in certain prior art devices, the rolls formed have a core that is so compressed, it is practically useless for feeding purposes.

From FIG. 1, it will be seen that the upper apron 82 is in an N-shaped, compactly contracted position. In this position, a substantial length of the apron which extends from sprockets 110, down and around sprockets 112 and up to sprockets 112 and up to sprockets 102, is disposed in contracted manner within at least part of the space ultimately occupied by the roll 88 of material confined by the circular configuration of the lower course of the upper apron 82 shown in FIG. 2.

Movement of the upper apron 82 between such positions is controlled by mechanism connected to the opposite ends of shaft 104 upon which ends of arms 106 and 108 are fixed and comprising a pair of similar cam plates 198 respectively fixed to the opposite ends of shaft 104 and extending radially therefrom. A cable 200 is connected at one end to a pin 202 on the cam plates 198 and extends around a guide pulley 204 on bracket arm 206 fixed to the upper end of vertical frame 14. Similar arrangements are provided at each side of the machine. The other end of each cable 200 is connected to one end of a very strong tension spring at each side of the machine. The opposite end of said springs are anchored to pins 210 on frame member 18 at each side of the machine.

As the roll of hay or the like increases in diameter due to the coiling thereof within the initial space 196 shown in FIG. 1, the lower course of upper apron 82 between sprockets 114 and guide members 118 will gradually be raised by the roll, with the result that the lower courses of said apron will be lifted from the auxiliary guide members 118. As described hereinafter, said auxiliary guide members will be retracted into accommodating spaces in the side plates of the machine so as not to interfere with the movement of the ends of the roll 88 of hay and the like which is being formed. Also, such upward movement of the lower course of the apron 88 will require an extension of the amount of such lower course which is in engagement with the upper surface of the roll 88 of material. Such expansion in said lower course is provided by counter-clockwise rotation of the arms 106 and 108, as viewed in FIGS. 1 and 2. Such rotation is resisted by the springs 208 at opposite sides of the machine and this results in suitable compression force being applied to the roll 88 to render it compact. Also, when the lower course of the upper apron 82 has reached its maximum expanded position, as illustrated in FIG. 2, the chains of said lower course will ride upon the concave edges of the arcuate guide bars 90 respectively fixed to the arcuate frame members 34 of upper frame 30, whereby said lower course of the upper apron will in no way interfere with the movement of the upper course of said apron, as can be clearly seen from FIG. 2 which is the position in which the upper and lower courses thereof will approach each other most closely.

Due to the tension constantly exerted by the springs 208 upon the arms 106 and 108 and especially upon the guide sprockets 110 and 112 respectively carried thereby, engagement of the chains of the upper apron 82 with the various guide sprockets for the same will be maintained at all times. Further, due to the fact that the chains at opposite sides of the upper apron 82 will mesh with the driving sprockets 114 respectively fixed to the opposite ends of shaft 116, there will be no tendency for variaion occuring in the movements of the chains at opposite ends of the upper apron and thus the bars 86 of the upper apron will be maintained constantly parallel to the axes of the various shafts extending between opposite sides of the machine.

It also will be seen especially from FIGS. 1 and 2 that even though there is the possibility for the upper apron 82 to expand around a relatively large diameter of roll 88 of material, such as of the order of as much as 6 or 7 feet, it'll be seen that at no time is the upper apron disposed in any outwardly extending position of great extent, whereby the disposition of said upper apron is substantially compact at all times.

Referring to FIGS. 8–12, wherein details of the auxiliary guide members 118 are illustrated, it'll be seen that the members 118 have a rounded, arcuate upper surface 212 which is slideably engaged by the chains 84 of the upper apron 82. Normally, the members 118 are maintained in the extended position such as shown in FIG. 9. This position is maintained by a shaft 214 which is pivotally connected at one end to ear means 216 on member 118. A compression spring 218 surround the shaft 214 to normally urge the member 118 to projected position such as shown in FIG. 9. Spring 218 extends between a washer fixed to shaft 214 and a bracket 220 which is supported by a suitable angle member connected to the exterior surface of the side plates 192 at opposite sides of the machine. Member 118 also has a pair of parallel legs 222 which are pivotally supported by horizontal shaft 224 which is suitably connected to the side plate 192. Said side plate also has an appropriate opening 225 formed therein through which the member 118 moves to the retracted position shown in FIG. 10, against the compressive force of spring 218.

The members 118 at opposite sides of the machine are forced from the projected position of FIG. 9 to the retracted position of FIG. 10 by engagement of the members 118 by the opposite ends of the roll 88 of hay or the like. They also will be maintained in said retracted position as long as the roll 88 of hay remains in the machine. However, after discharge of the roll, the springs 218 restore the members 118 to the projected, operative position such as shown in FIG. 9 in order that the lower course of the upper apron 82 may slideably engage the same for support incident to the apron 82 forming one boundary of the wedge shaped space 196.

DISCHARGE OPERATIONS

When the roll 88 of hay or the like has reached either a desired or maximum diameter capable of being formed by the machine, the operator of the tractor actuates a valve, not shown, to introduce fluid by conventional means to one end of the cylinder units 46 and thus effect raising of the upper frame 30 from the position shown in FIGS. 1 and 2 to the discharge position shown in FIG. 3. As described above, such movement releases the tightening sheaves 174 from the belts 172 and thus disconnects driving power from the upper apron 82. However, rearward movement of the upper courses of the chains 70 comprising the lower apron continues from the driving imparted to shaft 74 by sprocket gear 154. Referring particularly to FIGS. 11 and 12, it'll be seen that on alternate successive links of the chains 70, the lugs or blades 80 are provided to effect positive engagement between the chains 70 and the lower surface of the roll 88 of the material being formed into a roll. During such formation, the roll will be rotated in the direction of the arrow illustrated in exemplary manner in FIG. 3. The shape of the lugs or teeth 80 also is important. They may be considered to be of an aggresive nature. The lugs on the upper course of the chains have a substantially perpendicular leading edge 226 and a downward and rearward sloping upper edge 228, considered relative to direction of movement of said lugs in the upper course of the chains 70, as indicated by the directional arrows in FIG. 9. Not only is the function of the lugs 80 to firmly and aggressively engage the lower surface of the roll 88 of material but the concentrated engagement of all of the lugs 80 on all of the chains 70 with the lower surface of the roll 88 results in orientation of the stems and fibers of the agriculture forage crops being formed into the roll so that the same extend circumferentially throughout the roll and, when the roll is left in a field for feeding of stock or the like, such rolls have a substantial tendency to shed rain and other inclement weather substances in a highly satisfactory manner.

The discharge end of the bottom or bed 76 of the machine terminates in a series of similar plates 230 which have side flanges 232 extending downwardly. The side flanges of adjacent plates 230 are spaced apart even distances, as shown in FIG. 12. The spaces 234 thus formed are sufficiently wide to receive the chains 70, and the lugs 80 which project therefrom, when the outer ends of the plates 230 are in the elevated position thereof shown in FIG. 11. Thus, the chains and the lugs 80 disappear through said spaces and this results in the lugs disengaging the roll of material which is being rotated clockwise, relative to FIGS. 1–3, while the lower surface of the roll slides in a rearward direction with respect to the stationary bottom or floor 76 of the machine.

For safety and protection, the upper frame 30 also is provided with outer cover plates 254 which at least partially extend around and between the arcuate frame members 34 of upper frame 30.

From the foregoing, it will be seen that the present invention provides a highly versatile machine for forming large sizes of compact rolls of agriculture forage material such as hay and other similar crops. The rolls are formed while out of contact with the ground, thus minimizing waste of the material being harvested and also keeping the rolls in clean condition and relatively free from dirt, stones and other undesirable material which may occur in fields from which the crop is being harvested. All moving elements of the machine are power driven in a manner which achieves maximum efficiency. Further, the lower course of the upper apron is arranged and supported by mechanism which disposes it above the upper course of the lower apron in a manner to provide a space which, in side elevation, is wedge shaped to facilitate the initial formation of a coil of the material between the aforementioned courses of the upper and lower aprons and, more importantly, to form a relatively soft core in the roll to insure ready comsumption of the entire roll, including the core, by livestock, notwithstanding subsequent reasonable degree of compression introduced into the roll by the continued coiling of material onto the same as the size increases.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. A mobile hay roll forming machine comprising in combination a frame having forward and rearward ends, wheels on opposite sides of said frame to support the same for mobility over a swath of hay to be formed into a compact roll, rotatable pickup means supported by the forward portion of said frame, power means to drive said pickup means in a direction to pickup said swath, endless lower flexible means supported by said frame and having a substantially horizontal upper course positioned to receive adjacent the forward end of said frame hay picked up from a field by said pickup means, drive means connected to said lower endless flexible means and operable to move said upper course thereof rearwardly and support a roll of hay thereon as the same is being coiled during operation of said machine, an endless upper apron, means on said frame supporting said upper apron and positioning the lower course of said upper apron above said upper course of said lower flexible means to define a roll-forming cavity, the distance between said upper and lower courses being less at the forward end than at the rearward end thereof, thereby to define a wedge-shaped cavity in side elevation having the greater vertical dimension at the rear end, and drive means on said frame for said upper apron connected thereto and operable to move the lower course thereof forwardly and in opposition to the upper course of said lower flexible means, thereby to effect a coiling action upon a swath of hay received from said pickup means.

2. The machine according to claim 1 in which said endless lower flexible means comprises a series of lugged chains spaced transversely apart and guided by means stationarily supported in the lower portion of said frame, said lugged chains engaging the lower portion of a roll of hay while being rotated between said chains and upper apron positively to insure rotation of said roll and also tend to orient the stems and fibers of at least some of said hay in said roll to extend generally circumferentially in said roll.

3. The machine according to claim 2 in which said machine includes means to guide said lower course of said upper apron relative to said lower apron in a direction to define the upper boundary of said wedge-shaped space, said guide means being positioned to be disengaged from said upper apron when the diameter of a roll of hay increases to a size by which the roll causes said upper apron to disengage said guide means.

4. The machine according to claim 3 in which said lower course of said upper apron extends rearward and downward from said guide means prior to discharge of a roll from said machine to cause said upper apron to restrain rearward movement of a roll of hay being formed by said aprons.

* * * * *